United States Patent [19]
Terasawa et al.

[11] Patent Number: 5,136,431
[45] Date of Patent: Aug. 4, 1992

[54] ZOOM LENS OF THE INTERNAL FOCUS TYPE

[75] Inventors: Chiaki Terasawa; Kiyoshi Fukami, both of Kanagawa; Jun Hosoya, Tokyo; Shigeru Oshima, Kanagawa, all of Japan

[73] Assignee: Canon Kabushiki Kaisha, Tokyo, Japan

[21] Appl. No.: 630,761

[22] Filed: Dec. 21, 1990

Related U.S. Application Data

[63] Continuation of Ser. No. 444,942, Dec. 4, 1989, abandoned.

Foreign Application Priority Data

Dec. 6, 1988 [JP] Japan .................. 63-308670

[51] Int. Cl.$^5$ .............................. G02B 15/14
[52] U.S. Cl. ........................ 359/684; 359/687; 359/688
[58] Field of Search ............. 350/427, 423; 359/684, 359/687, 688

[56] References Cited

U.S. PATENT DOCUMENTS

| 4,052,372 | 10/1977 | Schröeder | 350/427 |
| 4,702,567 | 10/1987 | Kato et al. | 350/427 |

FOREIGN PATENT DOCUMENTS

| 45-12715 | 5/1970 | Japan . |
| 54-127321 | 10/1979 | Japan . |
| 59-074524 | 4/1984 | Japan . |

Primary Examiner—Scott J. Sugarman
Attorney, Agent, or Firm—Fitzpatrick, Cella, Harper & Scinto

[57] ABSTRACT

A zoom lens is disclosed comprising a front lens unit, an intermediate lens unit having two lens sub-units with their axial separation varying for zooming purposes, and a rear lens unit, wherein at the wide-angle end, focusing is performed by moving at least the rear lens unit, and, at the telephoto end, focusing is performed by moving the intermediate lens unit and the rear lens unit, whereby the amount of focusing movement of the intermediate lens unit from an infinitely distant object to an object at a certain short distance is greater at the telephoto end than at the wide-angled end.

14 Claims, 5 Drawing Sheets

ZOOM LENS OF THE INTERNAL FOCUS TYPE

This application is a continuation of application Ser. No. 07/444,942 filed Dec. 4, 1989 now abandoned.

BACKGROUND OF THE INVENTION

1. Field of the Invention

This invention relates to zoom lenses and, more particularly, to a technique on focusing of the zoom lens.

2. Description of the Related Art

Focusing of the conventional zoom lens is usually performed by moving that lens unit which lies ahead the zoom section, or what is called the "front lens". As the merit of this front lens focusing method mention may be made of the possibility of carrying out focusing and zooming independently of each other. To extend the focusing range to shorter object distances, on the other hand, the total focusing movement must be increased. Further, to admit of that increase, the diameter of the front lens has to be increased. Otherwise, the light beam that proceeds to the margin of the image frame would be vignetted at the full open aperture, so that the sufficient optical performance could not be ensured. This becomes an obstacle in the way to achieve an improvement of the compact form of and a reduction of the weight of the zoom lens. Further, there is limitation even on shortening of the M.O.D. (minimum object distance).

There are previous proposals for solving such problems in, for example, Japanese Laid-Open Patent Applications Nos. Sho 59-74524 and Sho 54-127321. In the former, a focusing technique by moving the variator lens unit constituting the zoom section, and, in the latter, another one by moving the compensator lens unit, are disclosed. Also, Japanese Patent Publication No. Sho 45-12715 discloses a technique of allowing close-up photography to be performed by moving the variator lens unit, the compensator lens unit and, further, a portion of the relay lens unit.

The above-described focusing methods of the Japanese Laid-Open Patent Applications Nos. Sho 59-74524 and Sho 54-127321 are not very advantageous, because the image magnification varies depending even on the object distance, because it is difficult to obtain an increased zoom ratio, and because the total focusing movement increases too rapidly as zooming nears the telephoto end, which calls for a need of, in advance, securing too much dynamic energy and too long space the focusing lens occupies.

Meanwhile, in the Japanese Patent Publication No. Sho 45-12715, the amount of focusing movement imparted into the zoom section is equal to the total focusing movement of the front lens focusing type. Therefore, though the size of the front lens can be reduced to some extent, there is a problem that a very valuable advance in reducing the diameter of the front lens cannot be achieved.

Yet another technique which is also similar to that of Japanese Patent Publication No. Sho 45-12715 is proposed in U.S. Pat. No. 4,054,372.

SUMMARY OF THE INVENTION

A first object of the invention is to achieve a minimization of the size of the zoom lens.

A second object of the invention is to provide a novel method of moving the zoom lens.

To attain these objects, according to the invention, a zoom lens comprises, from front to rear, a front lens unit, an intermediate lens unit having two lens sub-units with their axial separation varying for zooming, and a rear lens unit having a plurality of lenses, wherein at a wide-angle end, focusing is performed by moving at least one lens of the rear lens unit, and at a telephoto end, focusing is performed by moving the intermediate lens unit and the one lens of the rear lens unit, a required amount of movement of the intermediate lens unit for focusing from an infinitely distant object to a certain close object being greater at the telephoto end than at the wide-angle end.

DETAILED DESCRIPTION OF THE PREFERRED EMBODIMENTS

Figure 1A:
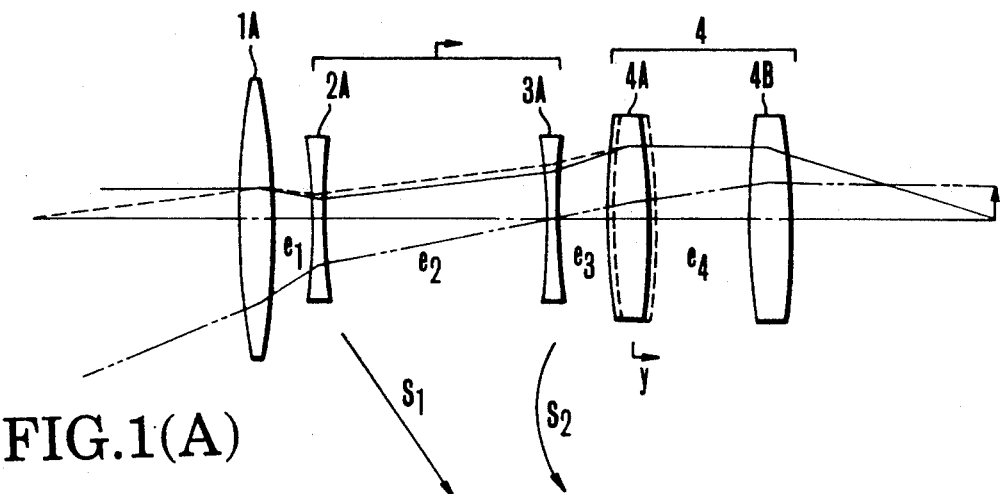
FIGS. 1(A) and 1(B) are diagrams for illustrating the zooming movement and the focusing movement of the zoom lens according to the invention.
Figure 1B:
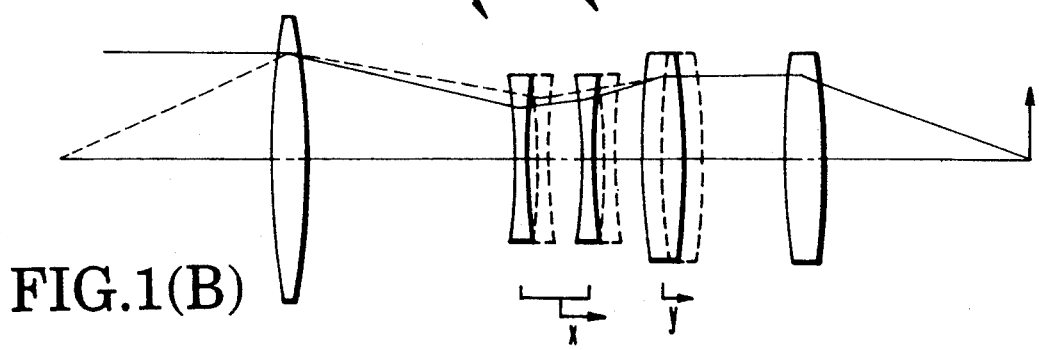

The zoom lens concerning the present invention is described along the drawings below. In FIGS. 1(A) and 1(B), a first lens unit 1A stationary during focusing and having a positive refractive power, a second lens unit 2A having a negative refractive power and movable to a direction of locus $S_1$ when zooming from the wide-angle end to the telephoto end, a third lens unit 3A having, for example, a negative refractive power so that it moves in directions indicated by a locus $S_2$ to compensate for the shift of an image plane resulting from the movement of the second lens unit 2A when zooming, the second and third lens units 2A and 3A constituting a zoom section, and a fourth lens unit 4 having a positive refractive power as a whole, bearing mainly the duty of the image forming function, and consisting of a front unit 4A and a rear unit 4B both having positive refractive powers, are arranged in this order from the front.

FIG. 1(A) and FIG. 1(B) show the different manners in which focusing is performed in the wide-angle end and the telephoto end respectively. The solid line indicates the position for an infinitely distant object, and the dashed line indicates the focused position to an object at a short distance.

And, FIG. 2 and FIG. 3 graphically show the refractive power arrangements of numerical examples 1 and 2 to be described later and the loci of motion of lens units during zooming alone and of combined motion of these lens units when zooming and focusing are carried out at once, wherein the solid line indicates the loci of motion of the second lens unit ($2a$, $2b$), the third lens unit ($3a$, $3b$) and the front unit ($4fa$, $4fb$) during zooming with an object at infinity, while the dashed line indicates the loci of motion of these lens units with an object at a finite distance, particularly a change of the zooming loci with focusing effected down to the minimum object distance.

In the present embodiment, as is understood from these graphs, at the wide-angle side, mainly the front unit 4A constituting part of the fourth lens unit 4 is made to move along an optical axis for focusing purposes, while at the telephoto side, along with the front relay unit 4A, the second lens unit 2A and the third lens unit 3A which constitute the zoom section, too, are made to move in constantly spaced relation to each other when focusing is performed. Also, for an object at infinity, zooming is performed by moving the second and third lens units while maintaining the constant position of the front relay unit. And, for an object at the finite distance, zooming is performed by moving the second and third lens units and the front relay unit in differential relation to one another.

By the way, as the object distance decreases, the image point of the first, second and third lens units (which functions as an object point for the front relay unit 4A) changes its position compared with when the object is at infinity. On the wide-angle side, however, because the first, second and third lens units constitute a system of reduced overall magnifications, the changed amount of position is small. Therefore, the required amount of movement of the front relay unit 4A for maintaining the constant position of an image point of the entire system can be minimized. And, since the interval el between the first and second lens units where the off-axis principal ray has a large angle of inclination is kept constant, the focusing range can be extended to shorter object distances without involving any increase of the diameter of the front lens unit.

Meanwhile, in the present embodiment, provision is made for preventing the image magnification from changing with focusing particularly on the telephoto side in such a way that the movement of the zoom section is made nearly equalized to the movement of the image point which the first lens unit in front of the zoom section forms, and at the same time the fourth lens unit.

The foregoing constructional features suffice for achieving a much desired increase of the zoom ratio in such a manner that the diameter of the front lens unit is suppressed from increasing. Yet, it is desirable that the amount of focusing movement X of the zoom section comprised of the aforesaid second lens unit and the aforesaid third lens unit lies in either of the following ranges:

For the wide-angle end: $0 \leq X = 0.4\Delta$ (1)

For the Telephoto end: $0.7\Delta \leq X \leq 1.2\Delta$ (2)

where $\Delta$ is the amount of movement of the image point that the aforesaid first lens unit forms as the object distance varies from infinity to a finite value.

The inequalities of condition (1) is to prevent the diameter of the front lens unit from increasing. When the upper limit is exceeded, the amount of movement of the zoom section becomes too much large. To preserve the desired optical performance, therefore, the diameter of the first lens unit comes to increase.

The inequalities of condition (2) are to achieve a minimization of the size of the zoom lens, while still securing the range of magnification, or permitting it to extend. When the lower limit is exceeded, variation of the magnification with focusing is caused to increase and it becomes difficult to secure the desired range of magnification.

When the upper limit is exceeded, on the other hand, the security of the range of magnification has to sacrifice the minimization of the amount of focusing movement. Therefore, it becomes difficult to construct the entirety of the zoom lens system in compact form.

Figures 4A, 4B:
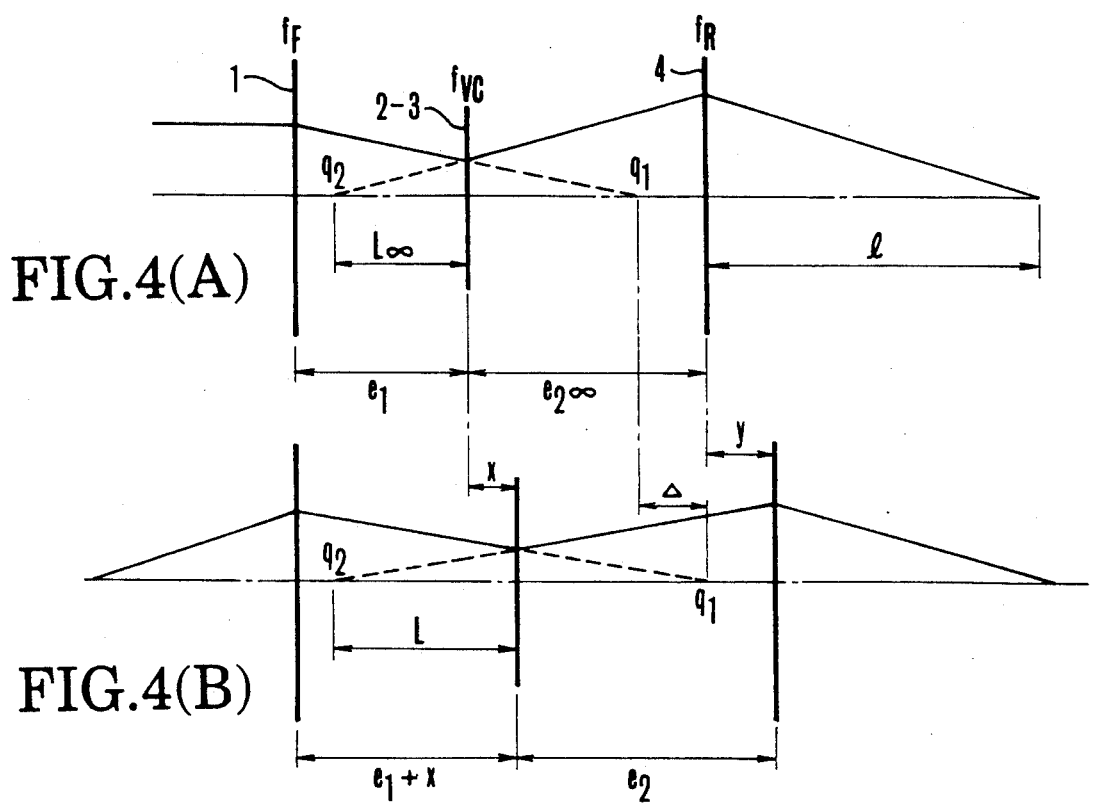
FIGS. 4(A) and 4(B) are thin lens arrangement diagrams for deriving a relation formula of the focusing movement of the zoom lens according to the invention.

Referring next to FIGS. 4(A) and 4(B) which show the paraxial arrangements and optical paths of the lens units for an infinitely distant object and a finitely distant object, when the object distance changes, the individual lens units, namely, the zoom section and the fourth lens unit, have to move by respective different distances x and y from each other to sharply focus on this object. Let us now derive a relationship between these two variables x and y by using the parameters shown in FIGS. 4(A) and 4(B) where $f_R$ is the focal length of the front relay unit, l is the distance between the image point by the front relay unit when the object distance is at infinity and the principal point of the front relay unit, $f_{VC}$ is the overall focal length of the zoom section, $e_1$ is the interval between the principal points of the first lens unit and the zoom section, $e_2$ is the interval between the principal points of the zoom section and the front relay unit, $\Delta$ is the distance by which the image point formed by the first lens unit is moved axially when focusing is effected from infinity to a finite object distance, L is the distance from the image point of the zoom section to the principal point of the zoom section, and $f_F$ is the focal length of the first lens unit.

With an object at infinity, from FIG. 4(A), two equations can be obtained as follows:

$$(f_F - e_1 + f_{VC})(L_\infty - f_{VC}) = -f_{VC}^2 \quad (3)$$

$$(f_R - e_{2\infty} + l^*)(l - f_R) = -f_R^2 \quad (4)$$

When focused to a short distance, from FIG. 4(B), the following equations can be obtained.

$$(f_F - e_1 - x + \Delta + f_{VC})(L - f_{VC}) = -f_{VC}^2 \quad (5)$$

$$(f_R - e_2 + L)(l - y - f_R) = -f_R^2 \quad (6)$$

$$e_{2\infty} = e_2 + x - Y \quad (7)$$

Solving these equations finally gives the following equation:

$$y - f_R^2/(l - f_R - y) + f_R^2/(l - f_R) = x + f_{VC}^2/(f_F - e_1 + f_{VC}) - f_{VC}^2/(f_F - e_1 + f_{VC} - x + \Delta) \quad (8)$$

Figure 2:
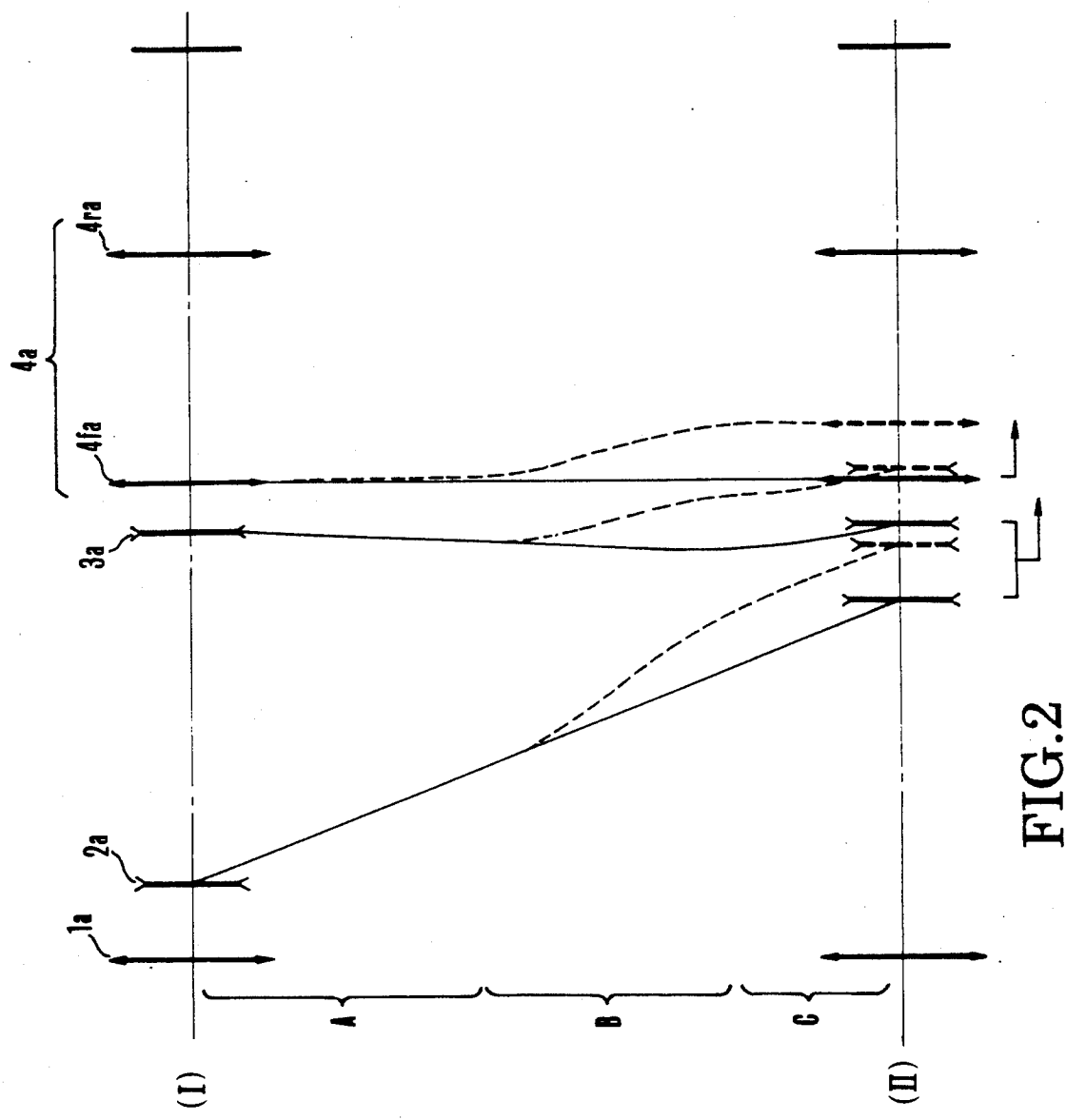
FIG. 2 is a diagram for illustrating the lens arrangement of a numerical example 1 of the invention.
Figure 3:
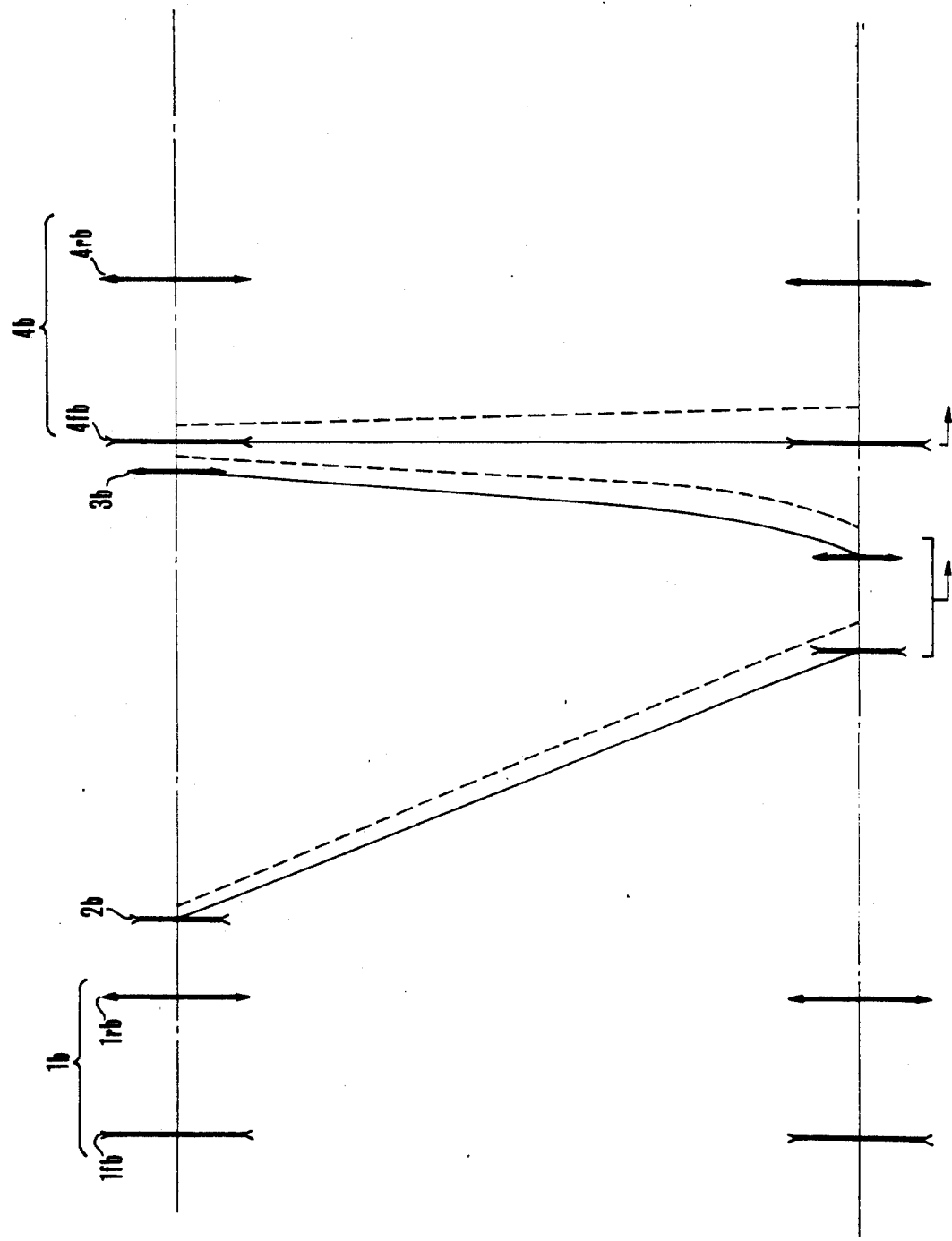
FIG. 3 is a diagram for illustrating the lens arrangement of a numerical example 2 of the invention.

This principle is next concretely explained on numerical examples 1 and 2 shown in FIG. 2 and FIG. 3.

A thin lens arrangement corresponding to the numerical example 1 of the invention is shown in FIG. 2 where the zoom lens comprises, from front to rear, a first lens unit 1a of positive power, a negative second lens unit 2a movable along an optical axis, a negative third lens unit 3a movable along the optical axis, and a fourth lens unit 4a which fulfills the image forming function, and further this fourth lens unit 4a is constructed from a positive front unit 4fa and a positive rear unit 4ra. And, the space between the front unit 4fa and 4ra is made afocal.

When the object distance is infinite, the zoom loci, as shown by the solid lines, are such that the negative second lens unit 2a linearly moves toward the image to vary the focal length of the entire system from the shortest to the longest, while the negative third lens unit 3a reciprocates on the optical axis to compensate for the shift of the image plane.

As the object distance decreases from infinity, focusing is performed in such a way as shown by the dashed lines that in a short focal length region A of the zooming range, mainly the front unit 4fa of the fourth lens unit 4a is moved rearward and in a long focal length region C, the second lens unit 2a, the third lens unit 3a and the front unit 4fa of the fourth lens unit 4a are moved at once rearward, while maintaining constant their interval. In an intermediate focal length region B, focusing is performed both by moving the second lens unit 2a and the third lens unit 3a rearward at once while maintaining constant their interval and, at the same time, by moving also the front unit 4fa of the fourth of movement of the zoom section comprised of the second lens unit 2a and the third lens unit 3a and the amount of movement of the front unit 4fa of the fourth lens unit 4a take values satisfying the above-described relationship of equation (8).

In this numerical example 1, measure has been taken that on the wide-angle side or in the region A, only the front unit 4fa of the fourth lens unit 4a is used in focusing, while, on the telephoto side or in the region C, the second lens unit 2a, the third lens unit 3a and the front unit 4fa of the fourth lens unit 4a are used in focusing, wherein to continuously connect the loci of the regions A and C with each other, the loci for the intermediate region B are determined by solving the equation (8). It is, however, to be understood that the zooming range is not necessarily divided into such regions. For instance, the zoom section and the front relay unit may be moved, according to the equation (8), at once continuously throughout the entire range from the wide-angle end to the telephoto end.

Another zoom lens shown in FIG. 3 is next described. This numerical example 2 is a zoom lens comprising a fixed first lens unit 1b consisting of a negative front unit 1fb and a positive rear unit 1rb, followed rearwardly by three movable lens units, i.e., a negative second lens unit 2b, a positive third lens unit 3b and a fourth lens unit 4b of positive power as a whole, the fourth lens unit 4b being constructed from a negative front unit 4fb and a positive rear unit 4rb.

When the object distance is infinite, the focal length of the entire system is varied in such a way as shown by zoom loci of the solid lines that the second lens unit 2b is linearly moved in a direction to the image, while the positive third lens unit 3b is non-linearly moved in a direction to the object. The third lens unit 3b also serve to fulfill the image shift compensating function.

When the object distance becomes finite, the zoom loci change to ones shown by dashed lines. In any zooming station, focusing is performed in such a way that as the object distance decreases, the second lens unit 2b and the third lens unit 3b move at once rearward while maintaining constant their interval, and the front unit 4fb also moves rearward in differential relation thereto. Then, the amount of focusing movement of the zoom section gets progressively longer toward the telephoto end.

During this time, the amount of movement of the zoom section comprised of the second lens unit 2b and the third lens unit 3b and the amount of movement of the front unit 4fb of the fourth lens unit 4b are determined so as to satisfy the relationship of equation (8).

Numerical data for the examples 1 and 2 of specific zoom lenses are given in tables below. In these tables, F represents the focal length of the entire system.

| Numerical Example 1 | | | | | |
|---|---|---|---|---|---|
| Object Distance | Lens Unit No. | Unit's Focal Length | Principal Point Interval | | |
| | | | F = 10.389 | F = 36.006 | F = 99.692 |
| ∞ | 1a | 99.587 | 15.644 | 55.360 | 72.371 |
| | 2a | −20.974 | 71.547 | 27.683 | 15.543 |
| | 3a | −46.531 | 10.417 | 14.567 | 9.695 |
| | 4fa | 42.052 | 46.658 | 46.658 | 46.658 |
| | 4ra | 41.397 | | | |
| 2m | 1a | 99.587 | 15.644 | 60.187 | 77.589 |
| | 2a | −20.974 | 71.547 | 27.683 | 15.543 |
| | 3a | −46.531 | 10.471 | 14.619 | 9.695 |
| | 4fa | 42.052 | 46.604 | 41.779 | 41.440 |
| | 4ra | 41.397 | | | |
| 1m | 1a | 99.587 | 15.644 | 65.013 | 83.381 |
| | 2a | −20.974 | 71.547 | 27.683 | 15.543 |
| | 3a | −46.531 | 10.523 | 14.742 | 9.695 |
| | 4fa | 42.052 | 46.552 | 36.830 | 35.648 |
| | 4ra | 41.397 | | | |

Wide-Angle End: X = 0
Telephoto End: X = Δ

| Numerical Example 2 | | | | | |
|---|---|---|---|---|---|
| Object Distance | Lens Unit No. | Unit's Focal Length | Principal Point Interval | | |
| | | | F = 8.145 | F = 33.572 | F = 100.168 |
| ∞ | 1fb | −94.679 | 28.354 | 28.354 | 28.354 |
| | 1rb | 57.697 | 15.953 | 55.517 | 70.953 |
| | 2b | −18.540 | 91.553 | 44.225 | 18.234 |
| | 3b | 27.148 | 6.520 | 14.284 | 24.838 |
| | 4fb | −38.057 | 33.018 | 33.108 | 33.108 |
| | 4rb | 37.954 | | | |
| 2m | 1fb | −94.679 | 28.354 | 28.354 | 28.354 |
| | 1rb | 57.692 | 15.953 | 58.917 | 74.524 |
| | 2b | −18.540 | 91.553 | 44.225 | 18.234 |
| | 3b | 27.148 | 6.541 | 14.509 | 25.056 |
| | 4fb | −38.057 | 33.086 | 29.483 | 29.319 |
| | 4rb | 37.954 | | | |
| 1m | 1fb | −94.679 | 28.354 | 28.354 | 28.354 |
| | 1rb | 57.692 | 15.953 | 62.517 | 78.254 |
| | 2b | −18.540 | 91.553 | 44.225 | 18.234 |
| | 3b | 27.148 | '16.562 | 14.753 | 25.296 |
| | 4fb | −38.057 | 33.066 | 25.638 | 25.350 |
| | 4rb | 37.954 | | | |

Wide-Angle End: X = 0.4 Δ
Telephoto End: X = 0.8 Δ

Incidentally, in the above embodiments, the relay front unit is moved for focusing. However, the relay front unit may be replaced by the relay rear unit or the whole relay lens unit being moved for focusing.

Figure 5:
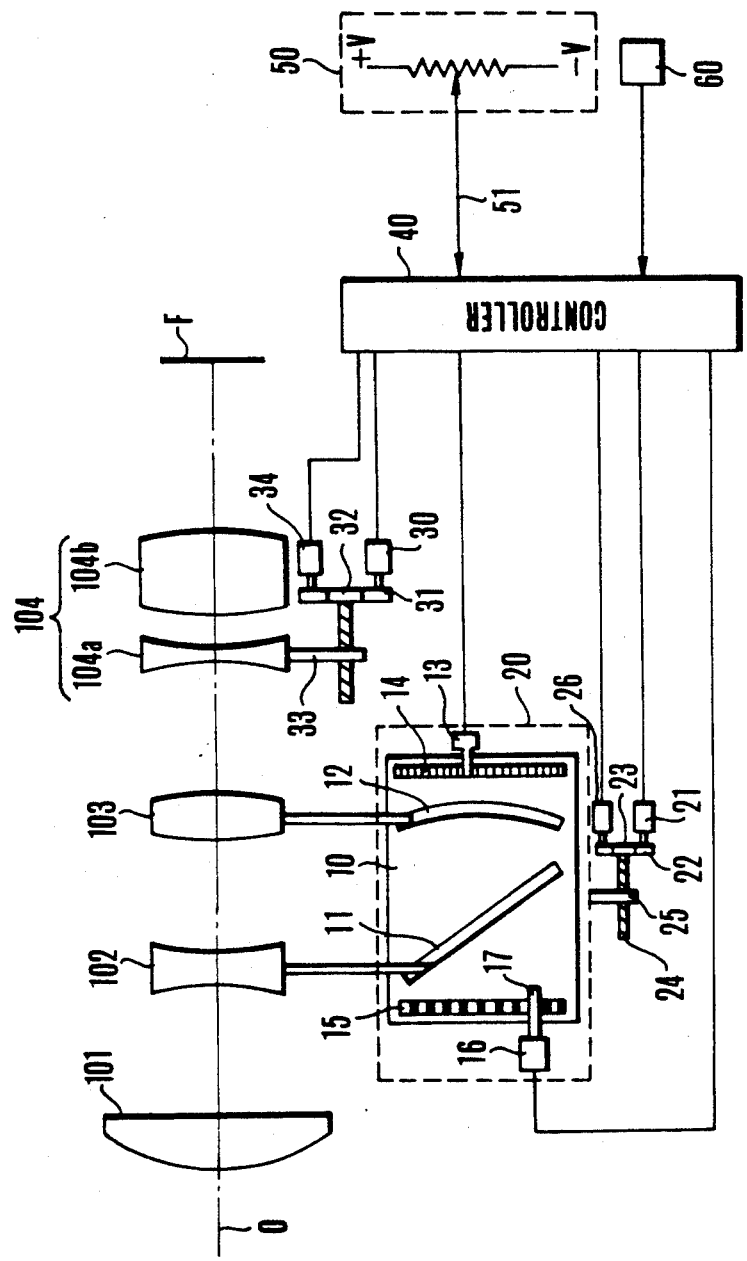
FIG. 5 is a schematic view illustrating a drive mechanism for the optical system of the invention.

Next, a drive mechanism for the zoom lens according to the invention and its control are described by reference to FIG. 5.

A first lens unit 101, a second lens unit 102, a third lens unit 103 and a fourth lens unit 104 of which a front part 104a moves when focusing, and a rear part 104 is stationary, form an image of an object on a film plane or focal plane F. A rotatable sleeve 10 has zoom cams 11 and 12. An electric motor 13 is drivingly connected to the sleeve 10 through a gear 14. As the sleeve 10 rotates, the second lens unit 102 and the third lens unit 103 move along a common optical axis O to effect zooming. A code plate 15 is mounted on the rotatable sleeve 10 to cooperate with an encoder 16 having a probe 17 for detecting the zooming position or a value of the focal length. An outer sleeve 20 carries a unit comprised of the rotatable sleeve 10, the motor 13 and the encoder 16 so that it moves the zoom section of the second lens unit 102 and the third lens unit 103 along the optical axis O when focusing and zooming. Another electric motor 21 is drivingly connected to this sleeve 20 through a gear mechanism 22 and a screw-threaded guide bar 24 so that it moves along the optical axis O. The axial position of the sleeve 20 is detected by a position detector circuit 26. Yet another electric motor 30 is used to move the front relay unit 104a along the optical axis O when focusing and when zooming, as it is connected to this lens unit 104a through a gear mechanism 31 and a screw-threaded guide bar 32. The position of the lens unit 104a is detected by a position detector circuit 34.

An zoom operating member 50 in the form of a potentiometer for determining the zooming direction and the zooming speed and another operating member 60 which is used for manual focusing have their outputs connected to a controller 40.

Under the above-described arrangement, suppose first focusing is performed at a certain constant focal length by using the focus operating member 60, then the output of the encoder 16 representing the given zooming position is accepted by the controller 40 to compute the required amounts of movement of the front relay unit 104a and the zoom section of the lens units 102 and 103 for the activated amount of the operating member 60. Then these lens units are moved by means of the motors 21 and 30.

Next, in a case where zooming is performed under the in-focus state, the controller 40 commands that the inner sleeve 10 is rotated in response to the output signal 51 from the zoom operating member 50, while the outer sleeve 20 and the front relay lens 104a are simultaneously moved in response to the output of the encoder 16 so that despite the change of the focal length, the in-focus state is always preserved.

As has been described above, the use of a technique that on the wide-angle side focusing is performed mainly by at least one lens of the relay lens unit, and in the other region of the zooming range, focusing is performed by moving the second lens unit and the third lens unit in fixed relation to each other, and at the same time at least part of the relay lens unit in differential relation to the zoom section, wherein the amount of focusing movement of the zoom section is made ever greater as the focal length increases, leads to a possibility of making the diameter of the front lens unit smaller than was heretofore possible. Compared with the conventional zoom lens whose front lens unit was relatively heavy, therefore, a zoom lens of reduced weight can be realized.

What is claimed is:

1. A zoom lens system comprising:
   from front to rear,
   a front lens unit;
   an intermediate lens unit having two lens sub-units with their axial separation varying for zooming; and
   a rear lens unit having a plurality of lenses,
   wherein at the wide-angle end, focusing is performed at least by moving one lens of said rear lens unit, and at the telephoto end, focusing is performed by moving said intermediate lens unit and said one lens of said rear lens unit, wherein an amount of focusing movement of said intermediate lens unit for focusing from an infinitely distant object to a certain close object is greater at the telephoto end than at the wide-angle end.

2. A zoom lens according to claim 1, satisfying the following conditions:

at the wide-angle end: $0 \leq X \leq 0.4\Delta$ at the telephoto end: $0.7 \leq X \leq 1.2\Delta$ where X is the amount of focusing movement of said intermediate lens units for focusing from an infinitely distant object to a certain finitely distant object, and a $\Delta$ is the amount of movement of an image point formed by said front lens unit from the infinitely distant object to the certain finitely distant object.

3. A zoom lens system according to claims 1 or 2, wherein said front lens unit has a positive refractive power.

4. A zoom lens having an optical axis, comprising:
   a first lens unit having a positive refractive power;
   a second lens unit following said first lens unit, having a negative refractive power and moving along the optical axis for zooming;
   a third lens unit following said second lens unit and moving along the optical axis for zooming; and
   a fourth lens unit following said third lens unit and having a plurality of lenses,
   wherein said zooming onto an infinitely distant object is performed by moving said second and third lens units while keeping said fourth lens unit stationary, and zooming onto a finitely distant object is performed by moving said second lens unit, said third lens unit and at least one lens of said fourth lens unit.

5. A zoom lens according to claim 4, wherein focusing at a telephoto side is performed by moving at least said second and third lens units in unison.

6. A zoom lens according to claim 5, wherein an amount of focusing movement of said second and third lens units for focusing from an infinitely distant object to a certain close object becomes greater as zooming approaches the telephoto end.

7. A zoom lens according to claim 6, satisfying the following conditions:

at the wide-angle end: $0 \leq X \leq 0.4\Delta$ at the telephoto end: $0.7\Delta \leq X \leq 1.2\Delta$ where X is an amount of focusing movement of said second and third lens units for focusing from an infinitely distant object to a certain finitely distant object, and $\Delta$ is an amount of movement of an image point formed by said first lens unit from the infinitely distant object to the certain finitely distant object.

8. A zoom lens system, comprising:
   a variator portion, having a plurality of lens units, for zooming by changing interspaces of the lens units,
   a rear lens unit located behind said variator portion and including a focusing lens,
   wherein the focusing is effected by moving at least said focusing lens at a wide angle end, while at a telephoto end the focusing is effected by moving said focusing lens and lens units of said variator portion, and a focusing movement amount of said lens units of said variator portion is larger at the telephoto end than at the wide angle end.

9. A zoom lens system according to claim 8, which further comprises a front lens unit located in front of said variator portion.

10. A zoom lens system according to claim 9 which satisfies the following conditions:

at the wide angle end: $0 \leq X \leq 0.4\Delta$ at the telephoto end: $0.7 \leq X \leq 1.2\Delta$ wherein X represents the focusing movement amount of the lens unit of the variator portion at the time of focusing on a predetermined finitely distant object from an infinitely distant object and $\Delta$ represents the movement amount of the image point formed by said front lens unit when focusing from the infinitely distant object to the predetermined finitely distant object.

11. A zoom lens system according to claim 10, wherein said front lens unit has a positive refractive power.

12. A zoom lens system according to claim 11, wherein said variator portion has a first negative lens unit and second negative lens unit and performed zooming by varying an air space between the first and second negative lens units.

13. A zoom lens system according to claim 11, wherein said variator portion has a negative lens unit and a positive lens unit and performs zooming by varying an air space between the negative lens unit and the positive lens unit.

14. A zoom lens system according to claim 8 in which said focusing lens moves during zooming.

* * * * *

UNITED STATES PATENT AND TRADEMARK OFFICE
CERTIFICATE OF CORRECTION

PATENT NO. : 5,136,431

DATED : August 4, 1992

INVENTOR(S) : CHIAKI TERASAWA, ET AL.

It is certified that error appears in the above-identified patent and that said Letters Patent is hereby corrected as shown below:

On the Title page,

IN THE ABSTRACT [57]:

Line 12, "wide-angled" should read --wide-angle--.

IN THE REFERENCE CITED: item [56]

Line 2, "4,052,372" should read --4,054,372--.

Column 3:

Line 25, "interval e1" should read --interval $e_1$--.

Line 36, "unit." should read --unit is made to move in, for example, the front unit.--

Column 4:

Line 31, "$(f_R-e_2\infty+1\infty)\ (1-f_R)=-f_R^2$  (4)" should read --$(f_R-e_2\infty+L\infty)\ (1-f_R)=-f_R^2$  (4)--.

Column 5:

Line 11, "fourth of" should read --fourth lens unit 4a rearward in such relation that the amount of--.

Line 48, "serve" should read --serves--.

Column 6:

NUMERICAL EXAMPLE 2:

Line 39, "16.562" should read --6.562--.

Line 40, "-38.057" should read -- -18.057--.

UNITED STATES PATENT AND TRADEMARK OFFICE
CERTIFICATE OF CORRECTION

PATENT NO. : 5,136,431

DATED : August 4, 1992

INVENTOR(S) : CHIAKI TERASAWA, ET AL.

It is certified that error appears in the above-identified patent and that said Letters Patent is hereby corrected as shown below:

<u>Column 8</u>:

Line 23, "said" should read --when--.

Line 65, "claim 9" should read --claim 9,--.

<u>Column 10</u>:

Line 3, "and" (first occurrence) should read --and a-- and "and performed" should read --performs--.

Line 11, "claim 8" should read --claim 8,--.

Signed and Sealed this

Twenty-eighth Day of September, 1993

*Attest:*

*Attesting Officer*

BRUCE LEHMAN

*Commissioner of Patents and Trademarks*